United States Patent
Staring

(10) Patent No.: US 9,425,864 B2
(45) Date of Patent: Aug. 23, 2016

(54) WIRELESS INDUCTIVE POWER TRANSFER

(71) Applicant: KONINKLIJKE PHILIPS N.V., Eindhoven (NL)

(72) Inventor: Antonius Adriaan Maria Staring, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 122 days.

(21) Appl. No.: 14/347,338

(22) PCT Filed: Sep. 21, 2012

(86) PCT No.: PCT/IB2012/055019
§ 371 (c)(1),
(2) Date: Mar. 26, 2014

(87) PCT Pub. No.: WO2013/046104
PCT Pub. Date: Apr. 4, 2013

(65) Prior Publication Data
US 2014/0232201 A1    Aug. 21, 2014

(30) Foreign Application Priority Data
Sep. 30, 2011  (EP) .................................. 11183389

(51) Int. Cl.
*H01F 38/14*    (2006.01)
*H02J 50/05*    (2016.01)
(Continued)

(52) U.S. Cl.
CPC .............. *H04B 5/0037* (2013.01); *H01F 38/14* (2013.01); *H02J 5/005* (2013.01); *H04B 5/0031* (2013.01)

(58) Field of Classification Search
CPC .... H04B 5/0037; H04B 5/0031; H01F 38/14; H02J 5/005

USPC ........................................................ 307/104
See application file for complete search history.

(56) References Cited

U.S. PATENT DOCUMENTS

2003/0024985 A1    2/2003  Reis
2003/0043027 A1 *  3/2003  Carson .................... H04B 3/54
                                                    375/259
(Continued)

FOREIGN PATENT DOCUMENTS

WO    WO2006004990 A2    1/2006
WO    WO2006109032 A1    10/2006

OTHER PUBLICATIONS

System Description, Wireless Power Transfer, vol. I: Low Power, Part 1: Interface 25 Definition, Version 1.0 Jul. 2010, published by the Wireless Power Consortium www.wirelesspowerconsortium.com/downloads/wireless-power-specification-part-1.html.
(Continued)

*Primary Examiner* — Jared Fureman
*Assistant Examiner* — Emmanuel R Dominique
(74) *Attorney, Agent, or Firm* — Larry Liberchuk

(57) ABSTRACT

A power transmitter (101) transfers power to a power receiver (105) using a wireless inductive power signal. The power transmitter (101) comprises an inductor (103) for providing the power signal and a power signal generator (207) for driving the inductor (103) to provide the power signal. The power receiver (105) comprises an inductor (107) for receiving the power signal and a transmitter (305) which transmits data messages to the power transmitter (101). The data are communicated by load modulation of the power signal in repeating load modulation intervals which are separated by intervening time intervals. The power transmitter (101) transmits data to the power receiver (105) by modulating the power signal with a message during the intervening time intervals and the power receiver demodulates the data in these time intervals. The power transmitter (101) transmits single bit of the message by modulating it across a plurality of intervening time intervals and the power transmitter (101) receives it by demodulating over these time intervals.

18 Claims, 12 Drawing Sheets

(51) Int. Cl.
  *H04B 5/00* (2006.01)
  *H02J 5/00* (2016.01)

(56) References Cited

U.S. PATENT DOCUMENTS

| | | | |
|---|---|---|---|
| 2005/0077356 A1* | 4/2005 | Takayama | G06K 7/10237 |
| | | | 235/451 |
| 2009/0284082 A1 | 11/2009 | Mohammadian | |
| 2009/0302800 A1 | 12/2009 | Shiozaki | |
| 2010/0146308 A1 | 6/2010 | Gioscia | |
| 2011/0006613 A1 | 1/2011 | Stevens | |
| 2011/0065398 A1 | 3/2011 | Liu | |
| 2011/0238518 A1* | 9/2011 | Florek | G06K 19/07732 |
| | | | 705/26.1 |
| 2013/0058263 A1* | 3/2013 | Ishizaki | H04W 4/008 |
| | | | 370/278 |
| 2014/0062588 A1* | 3/2014 | Gopalan | H03D 3/00 |
| | | | 329/304 |

OTHER PUBLICATIONS

Puers R. et al., "Wireless Inductive Transfer of Power and Data Modulation", Analog Circuit Design, 2006 Springer, pp. 395-414.

Coup R. et al., "An Inductively Coupled Universal Battery Charger", Department of Electrical and Electronic Engineering, Part IV Project Report 2003.

* cited by examiner

WIRELESS INDUCTIVE POWER TRANSFER

FIELD OF THE INVENTION

The invention relates to inductive power transfer and in particular, but not exclusively, to an inductive power transfer system in accordance with the Qi wireless power transfer standard.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

Qi originally defined a wireless power transfer for low power devices considered to be devices having a power drain of less than 5 W. Systems that fall within the scope of this standard use inductive coupling between two planar coils to transfer power from the power transmitter to the power receiver. The distance between the two coils is typically 5 mm. It is possible to extend that range to at least 40 mm.

However, work is ongoing to increase the available power, and in particular the standard is being extended to mid-power devices being devices having a power drain of more than 5 W.

The Qi standard defines a variety of technical requirements, parameters and operating procedures that a compatible device must meet.

Communication

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage. The data is formatted in bytes and packets.

More information can be found in chapter 6 of part 1 the Qi wireless power specification (version 1.0).

Although Qi uses a unidirectional communication link, it has been proposed to introduce communication from the power transmitter to the power receiver. However, such a bidirectional link is not trivial to include and is subject to a large number of difficulties and challenges. For example, the resulting system still needs to be backwards compatible and e.g. power transmitters and receivers that are not capable of bidirectional communication still need to be supported. Furthermore, the technical restrictions in terms of e.g. modulation options, power variations, transmission options etc. are very restrictive as they need to fit in with the existing parameters. It is also important that cost and complexity is kept low, and e.g. it is desirable that the requirement for additional hardware is minimized, that detection is easy and reliable, etc.

It is also important that the communication from the power transmitter to the power receiver does not impact, degrade or interfere with the communication from the power receiver to the power transmitter. Furthermore, an all-important requirement is that the communication link does not unacceptably degrade the power transfer ability of the system.

Accordingly, many challenges and difficulties are associated with enhancing a power transfer system such as Qi to include bidirectional communication.

System Control

In order to control the wireless power transfer system, the Qi standard specifies a number of phases or modes that the system may be in at different times of the operation. More details can be found in chapter 5 of part 1 the Qi wireless power specification (version 1.0).

The system may be in the following phases:

Selection Phase

This phase is the typical phase when the system is not used, i.e. when there is no coupling between a power transmitter and a power receiver (i.e. no power receiver is positioned close to the power transmitter).

In the selection phase, the power transmitter may be in a stand-by mode but will sense in order to detect a possible presence of an object. Similarly, the receiver will wait for the presence of a power signal.

Ping Phase:

If the transmitter detects the possible presence of an object, e.g. due to a capacitance change, the system proceeds to the ping phase in which the power transmitter (at least intermittently) provides a power signal. This power signal is detected by the power receiver which proceeds to send an initial package to the power transmitter. Specifically, if a power receiver is present on the interface of the power transmitter, the power receiver communicates an initial signal strength packet to the power transmitter. The signal strength packet provides an indication of the degree of coupling between the power transmitter coil and the power receiver coil. The signal strength packet is detected by the power transmitter.

Identification & Configuration Phase:

The power transmitter and power receiver then proceeds to the identification and configuration phase wherein the power receiver communicates at least an identifier and a required power. The information is communicated in multiple data packets by load modulation. The power transmitter maintains a constant power signal during the identification and configuration phase in order to allow the load modulation to be detected. Specifically, the power transmitter provides a power signal with constant amplitude, frequency and phase for this purpose (except from the change caused by load-modulation).

In preparation of the actual power transfer, the power receiver can apply the received signal to power up its electronics but it keeps its output load disconnected. The power receiver communicates packets to the power transmitter. These packets include mandatory messages, such as the identification and configuration packet, or may include some defined optional messages, such as an extended identification packet or power hold-off packet.

The power transmitter proceeds to configure the power signal in accordance with the information received from the power receiver.

Power Transfer Phase:

The system then proceeds to the power transfer phase in which the power transmitter provides the required power signal and the power receiver connects the output load to supply it with the received power.

During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly.

The system allows for an efficient setup and operation of the power transfer. However, the approach is restrictive and may not allow the full desired flexibility and support for functions as required. For example if a power receiver tries to get more than 5 W power from a power transmitter the power transmitter may terminate power transfer resulting in a bad user experience. Therefore, it is desirably to further develop the Qi standard to provide enhanced functionality, flexibility and performance.

In particular the unidirectional communication may be restrictive. Indeed, this requires that the power transmitter must be able to comply with any request by the power receiver and thus further requires the power receiver to be limited to only request parameters that it knows can be met by all power transmitters. Such an approach complicates or prevents further development of functionality as it will result in a lack of backwards compatibility.

As previously mentioned, the introduction of bidirectional communication in power transfer systems, such as Qi systems, is complicated and subject to many restrictions and requirements in order to ensure both efficient power transfer, efficient operation and not least backwards compatibility.

Hence, an improved power transfer system would be advantageous and in particular a system allowing increased flexibility, improved backwards compatibility, facilitated implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for transferring power to a power receiver using a wireless inductive power signal, the power transmitter comprising: an inductor for providing the power signal; a power signal generator for driving the inductor to provide the power signal; a receiver for receiving data messages from the power receiver, the data messages being communicated by load modulation of the power signal in repeating load modulation intervals, the repeating load modulation intervals being separated by intervening time intervals; a transmitter for transmitting data to the power receiver by modulating the power signal with a message during the intervening time intervals; wherein the transmitter is arranged to modulate a single bit of the message across a plurality of the intervening time intervals.

The invention may provide an improved power transfer system. It may in many embodiments allow for further extension and development of a power transfer system by introducing bidirectional communication. This may in many scenarios be achieved while maintaining backwards compatibility. The invention may allow a practical approach and may facilitate introduction into existing systems.

The approach may in particular provide for communication from a power transmitter to a power receiver which reduces impact on other functionality. In particular, the approach may allow an efficient separation of communication from the power transmitter to the power receiver and from the power receiver to the power transmitter, and may reduce the impact of the modulation on the power signal. As such, the impact of introducing bidirectional communication may be reduced for both the power transfer operation and the power receiver to power transmitter communication. This may in particular facilitate operation and implementation, as well as improve backwards compatibility. In particular, introduction of bidirectional communication to existing power transfer systems previously supporting only unidirectional communication may be facilitated. The approach may in many embodiments allow reuse of existing hardware for power transmitters and power receivers, and may require only a small change in the firmware, and a marginal change in the complexity.

A particular advantage of the approach is that it may in many embodiments reduce the impact of modulation on the power signal. The power signal may be less affected by the additional modulation and thus may interfere less with the power transfer operation. This may in particular be significant for backwards compatibility as legacy equipment may not be affected by the introduction of modulation that the equipment has not been designed for. In many embodiments, the deviations of the power signal due to the introduced modulation may be maintained to a sufficiently low level for it not to impact the power transfer characteristics for the system. Indeed, in many scenarios, the effects of the modulation may be kept to a level where they are imperceptible or negligible for the power transfer phase functionality (e.g. of legacy equipment). Thus, in many embodiments, the power transfer operation may be unaffected by the presence of modulation deviations on the power signal.

In particular, the modulation deviation may be made smaller and/or slower thereby reducing the impact. Furthermore, in many embodiments a more reliable communication can be achieved as the extended modulation time for the single bit allows increased symbol energy and accordingly a reduced error rate.

Furthermore, the approach may fit well with the design principles and philosophies of many existing power transfer systems. For example, the approach follows the design principles and philosophies of the Qi power transfer system.

The repeating load modulation intervals include at least three load modulation intervals corresponding to at least two intervening time intervals. The message may consist in the single bit or the single bit may be one out of a plurality of bits of the message.

The bit may be an information bit which is converted into a plurality of channel bits. Each channel bit may then be modulated on to the power signal. The modulation of one or more of the channel bits may be within a single intervening time interval. However, at least two channel bits will be in different intervening time intervals corresponding to the modulation of the information bit extending over at least these intervening time intervals.

The information bit may have a value that can be set independently of other information bits (not part of the same data symbol). A channel bit is dependent on the corresponding information bit, and typically a plurality of channel bits are dependent on the same information bit.

The single (information) bit may be a bit of a data symbol comprising more than the single bit. In some embodiments, each data symbol may correspond to a non-integer number of bits. For example, the bit may be comprised in a data symbol with three possible values corresponding to the data symbol representing $\log_2(3)=1.58$ bits.

In accordance with an optional feature of the invention, the transmitter is arranged to modulate the single bit in accordance with a predetermined modulation pattern, the modulation pattern defining modulation deviations to apply to the power signal in each of the plurality of intervening time intervals.

This may provide an improved communication in many embodiments. In many scenarios it may provide a low complexity and reliable approach for enabling communication from the power transmitter to the power receiver with a low impact on the power signal from the modulation. The approach may furthermore facilitate the demodulation, and indeed the power receiver need only know the predetermined modulation pattern in order to demodulate the power signal to provide the single bit.

The modulation deviation may specifically be an amplitude deviation, a frequency deviation or a phase deviation. The deviation represents a deviation relative to the power signal without any modulation being applied.

In accordance with an optional feature of the invention, the predetermined modulation pattern comprises one modulation value for each of the plurality of intervening time intervals, each modulation value defining a modulation offset for the power signal for a value of the single bit.

This may provide improved performance and/or facilitate operation. In many embodiments, it may provide reduced complexity.

The modulation values may define a value that should be applied to the power signal to represent a given value of the single bit. In many embodiments, the modulation offset applied to the power signal is determined in response to a data value independent modulation offset represented by the modulation value and the value of the single bit. In many embodiments, the single bit may be multiplied by the modulation value The modulation offset represents an offset relative to the power signal without any modulation, i.e. an unmodulated power signal. The offset may for example be an amplitude offset for amplitude modulation, a frequency offset for frequency modulation, or a phase offset for phase modulation (or a combination thereof).

In accordance with an optional feature of the invention, each modulation offset is a constant offset for the corresponding intervening time interval.

This may provide improved and/or facilitated communication from a power transmitter to a power receiver.

In accordance with an optional feature of the invention, each modulation offset is a non-constant predetermined pattern for the corresponding intervening time interval.

This may provide improved and/or facilitated communication from a power transmitter to a power receiver.

In accordance with an optional feature of the invention, the predetermined modulation pattern corresponds to an average deviation of the power signal due to modulation of the single bit of no more than a maximum deviation between two of the plurality of intervening time intervals.

The approach may provide a modulation pattern for which the average modulation deviation is kept low while allowing modulation offsets of sufficient size to allow demodulation. In particular, in some embodiments, the average deviation may be substantially zero. This may allow a modulated power signal which more closely corresponds to an unmodulated power signal and as such may reduce the implications of the modulation of the power signal.

In accordance with an optional feature of the invention, the predetermined modulation pattern corresponds to a maximum deviation of the power signal due to the modulation of the single bit of no more than 5%.

The approach may provide a modulation pattern with a low peak value, and consequently a reduced deviation from an unmodulated power signal. This may allow a modulated power signal which more closely corresponds to an unmodulated power signal and as such may reduce the implications of the modulation of the power signal.

In accordance with an optional feature of the invention, the predetermined modulation pattern corresponds to a series of step changes between constant deviations in each intervening time interval, the predetermined pattern comprising step changes of opposite signs.

This may reduce complexity in many embodiments and may typically allow an efficient implementation and reliable performance. The feature may in many embodiments allow a reduced deviation from an unmodulated power signal. This may allow a modulated power signal which more closely corresponds to an unmodulated power signal and as such may reduce the implications of the modulation of the power signal.

In accordance with an optional feature of the invention, the predetermined modulation pattern corresponds to a deviation of the power signal due to modulation of the single bit of less than a tolerance value for the power signal.

This may provide improved operation in many embodiments and may in particular ensure that modulation is sufficiently transparent for e.g. legacy equipment or functionality. In particular, it may ensure that the modulated power signal still meets the requirements for a power receiver.

In accordance with an optional feature of the invention, the modulation pattern corresponds to applying an offset to the power signal formed by a series of smaller changes to the power signal, each change corresponding to one intervening time interval.

This may provide improved operation and/or facilitated implementation in many embodiments.

In accordance with an optional feature of the invention, the transmitter is arranged to generate a modulation offset for a first intervening time interval by determining a sign value of the modulation offset in response to the single bit and an amplitude of the modulation offset in response to the predetermined modulation pattern corresponding to the first intervening time interval, and to apply the modulation offset to the power signal in the first intervening time interval.

This may provide efficient, low complexity, reliable and/or high performance operation and/or implementation.

In accordance with an optional feature of the invention, the predetermined modulation pattern represents an amplitude offset pattern for the power signal.

This may provide efficient, low complexity, reliable and/or high performance operation and/or implementation. The amplitude may typically be a voltage or current amplitude.

In accordance with an optional feature of the invention, the transmitter is arranged to transmit the message during a configuration phase performed by the power transmitter and the power receiver.

This may provide improved performance in many embodiments. In particular, the approach may allow bidirectional communication to be introduced to a configuration phase thereby providing for a more efficient and flexible interaction between power transmitter and power receiver. This may allow improved configuration and thus improved performance in many embodiments.

The approach may be particularly suitable for a configuration phase which is typically characterized by a series of repeating load modulation intervals separated by short intervening time intervals. Typically, communication of messages within single such intervening time intervals will require a high modulation depth and thus substantial modulation offsets. Such high modulation offsets will introduce a substantial impact of the modulation on the power signal which may disrupt or degrade other functionality, such as e.g. the power transfer operation.

In particular, the configuration phase may be a Qi Identification and Configuration Phase. The approach may allow introduction of bidirectional communication in the configuration phase while still allowing backwards Qi compatibility. In particular, the bidirectional communication may be introduced while still allowing the power signal to be sufficiently constant and similar to an unmodulated power signal to allow existing functionality designed for unmodulated power signals to be used. At the same time, the approach may ensure a more reliable communication and especially may allow symbol energies sufficiently high to ensure a sufficiently low data rate.

According to an aspect of the invention there is provided a power receiver for receiving power from a power transmitter using a wireless inductive power signal, the power receiver comprising: an inductor for receiving the power signal; a transmitter for transmitting data messages to the power transmitter, the data messages being communicated by load modulation of the power signal in repeating load modulation intervals, the repeating load modulation intervals being separated by intervening time intervals; a receiver for receiving a message from the power transmitter by demodulating the power signal during the intervening time intervals;

wherein the receiver is arranged to demodulate a single bit of the message across a plurality of the intervening time intervals.

According to an aspect of the invention there is provided a power transfer system comprising a power receiver and a power transmitter as described above.

According to an aspect of the invention there is provided a method of operation for a power transmitter arranged to transfer power to a power receiver using a wireless inductive power signal, the power transmitter comprising: an inductor for providing the power signal, and a power signal generator for driving the inductor to provide the power signal; the method comprising: receiving data messages from the power receiver, the data messages being communicated by load modulation of the power signal in repeating load modulation intervals, the repeating load modulation intervals being separated by intervening time intervals; transmitting data to the power receiver by modulating the power signal with a message during the intervening time intervals; wherein transmitter data comprises modulating a single bit of the message across a plurality of the intervening time intervals.

According to an aspect of the invention there is provided a method of operation for a power receiver arranged to receive power from a power transmitter using a wireless inductive power signal, the power receiver comprising an inductor for receiving the power signal, and the method comprising: transmitting data messages to the power transmitter, the data messages being communicated by load modulation of the power signal in repeating load modulation intervals, the repeating load modulation intervals being separated by intervening time intervals; and receiving a message from the power transmitter by demodulating the power signal during the intervening time intervals; wherein receiving comprises demodulating a single bit of the message across a plurality of the intervening time intervals.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
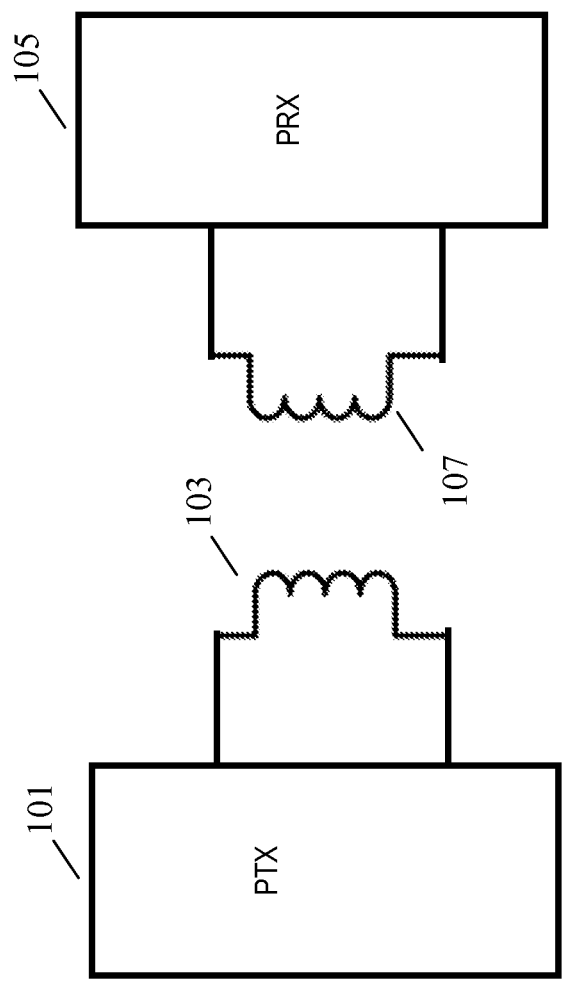
FIG. 1 illustrates an example of a power transfer system comprising a power transmitter and a power receiver in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the power receiver 105. Specifically, the power transmitter 101 generates a power signal which is propagated as a magnetic flux by the transmitter coil 103. The power signal may typically have a frequency between around 100 kHz to 200 kHz. The transmitter coil 103 and the receiver coil 105 are loosely coupled and thus the receiver coil picks up (at least part of) the power signal from the power transmitter 101. Thus, the power is transferred from the power transmitter 101 to the power receiver 105 via a wireless inductive coupling from the transmitter coil 103 to the receiver coil 107. The term power signal is mainly used to refer to the inductive signal between the transmitter coil 103 and the receiver coil 107 (the magnetic flux signal), but it will be appreciated that by equivalence it may also be considered and used as a reference to the electrical signal provided to the transmitter coil 103, or indeed to the electrical signal of the receiver coil 107.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 103 may substantially be compatible with the Qi Specification version 1.0 or 1.1 (except for the herein described (or consequential) modifications and enhancements).

To prepare and control the power transfer between the power transmitter 101 and the power receiver 105 in the wireless power transfer system, the power receiver 105 communicates information to the power transmitter 101. Such communication has been standardized in the Qi Specification version 1.0 and 1.1.

On physical level, the communication channel from the power receiver 105 to the power transmitter 101 is implemented by using the power signal as carrier. The power receiver 105 modulates the load of the receiver coil 105. This results in corresponding variations in the power signal at the power transmitter side. The load modulation may be detected by a change in the amplitude and/or phase of the transmitter coil 105 current, or alternatively or additional by a change in the voltage of the transmitter coil 105. Based on this principle, the power receiver 105 can modulate data which the power transmitter 101 demodulates. This data is formatted in bytes and packets. More information can be found in the "System description, Wireless Power Transfer, Volume I: Low Power, Part 1: Interface Definition, Version 1.0 July 2010, published by the Wireless Power Consortium" available via http://www.wirelesspowerconsortium.com/downloads/wireless-power-specification-part-1.html, also called the Qi wireless power specification, in particular chapter 6: Communications Interface.

To control the power transfer, the system may proceed via different phases, in particular a selection phase, a ping phase, identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The power receiver 105 can apply the received signal to power up its electronics. After receiving the power signal, the power receiver 105 communicates an initial packet to the power transmitter 101. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 105.

The messages from the power receiver 105 are not communicated continuously but are communicated in intervals, henceforth referred to as load modulation intervals. The phase comprises a plurality of these load modulation intervals, i.e. the load modulation intervals repeat thereby allowing more data/longer messages to be communicated by the power receiver 105. The intervals inbetween these load modulation intervals are intervening time intervals in which no load modulation is performed by the power receiver 105. However, the power signal is still provided by the power transmitter 101 in the intervening time intervals.

In the Identification and Configuration phase, the intervening time intervals between the load modulation intervals tend to have a relatively constant duration of around 7 msecs.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal.

Thus, in the power transfer phase, the power receiver 105 also performs load modulation of the power signal in load modulation intervals in order to communicate information to the power transmitter 101. However, in comparison to the Identification and Configuration phase, the intervening time intervals between load modulation intervals may differ substantially in duration. Furthermore, the intervening time intervals tend to be substantially longer and typically tend to exceed 200 msec.

It is noted that the Qi wireless power specification versions 1.0 and 1.1 define only communication from the power receiver 105 to the power transmitter 101, i.e. it defines only a unidirectional communication.

However, in the system of FIG. 1 bidirectional communication is used, i.e. communication of data is also possible from the power transmitter 101 to the power receiver 105. Various applications may benefit from such communication, for example: setting a power receiver in test mode, setting a power receiver in calibration mode, or allowing communication from power transmitter to power receiver under the control of the power receiver, e.g. for communicating a command, or status information from power transmitter to power receiver.

Figure 2:
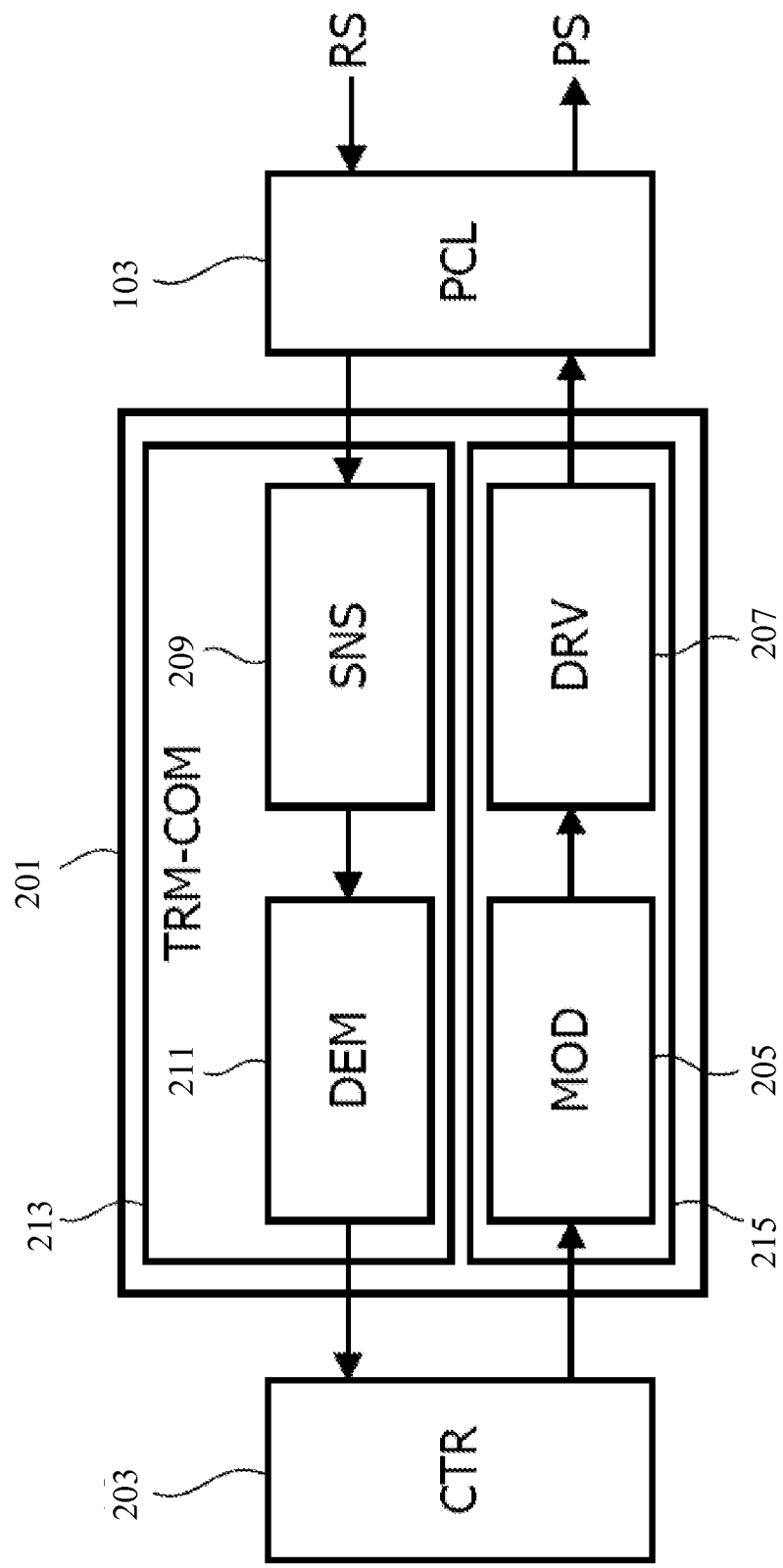
FIG. 2 illustrates an example of elements of a power transmitter in accordance with some embodiments of the invention.

FIG. 2 illustrates the power transmitter 101 of FIG. 1 in more detail. The transmitter coil 103, also called the primary coil 103 (PCL), is shown connected to a power transmitter communication unit 201 (TRM-COM), which is coupled to a transmitter controller 203 (CTR).

The power transmitter communication unit 201 has a modulator 205 (MOD), coupled to a driver 207 (DRV) for driving the transmitter coil 103 for transmitting a (potentially) modulated power signal (PS) via the transmitter coil 103 to the receiver coil 105.

In the system, the power receiver 105 may load modulate the power signal to send a power receiver signal to the power transmitter 101 via the receiver coil 107 and the transmitter coil 103. This signal is called a reflected signal (RS). The reflected signal is detected by a sense unit 209 (SNS), e.g. by sensing the current or voltage on the transmitter coil 103. A demodulator 211 (DEM) is coupled to the transmitter controller 203 for demodulating the detected signal, e.g. by converting changes in the amplitude or phase of the detected signal into bits.

In the example of FIG. 2, a first unit 213 is arranged to receive data messages from the power receiver 105 via the transmitter coil 103. The first unit 213 comprises the sense unit 209 and the demodulator 211. These two units implement the function of receiving the data via the transmitter coil 103. The transmitter coil 103 transmits a magnetic field (the power signal PS) for inductive power transfer to the receiver coil 107 and receives the reflected magnetic field (reflected signal RS) caused by the receiver coil 107 (i.e. the variations in the power signal caused by the load modulation). The sense unit 209 (current/voltage sensor SNS) senses the current/voltage on the transmitter coil 103. The demodulator 211 translates changes of amplitude or phase of the sensed signal into data.

The load modulation is performed in repeating load modulation intervals which are separated by intervening time intervals. Specifically, in the identification and configuration phase, the load modulation is performed in load modulation intervals with a duration of 20-60 msecs which are separated by intervening time intervals with a duration of approximately 7 msecs.

The transmitter controller 203 interprets the received data and may in response control a second unit 205 to transmit a message to the power receiver 105 via the transmitter coil 103. The message may in the example specifically be a response message intended for responding to messages from the power receiver 105, and may specifically be an acknowledge/non-acknowledge or accept/reject message. Such a communication arrangement may allow a low complexity approach and may avoid the need for complex communication functionality and protocols for supporting the power transmitter to power receiver communication. The approach may further allow the power receiver to remain the controlling element for the power transfer, and thus fits well with the general design principles of the Qi power transfer approach.

Specifically, the transmitter controller 203 controls the modulator 205 which modulates the power signal to provide the desired message. The modulator 205 may specifically modulate the power signal by changing the amplitude, frequency, or phase of the power signal, i.e. it may typically use AM, FM and/or PM modulation. The driver 207, also comprised by the second unit 215, is arranged to transmit the modulated power signal via the transmitter coil 103 to the power receiver 105 by supplying an alternating electric signal to the transmitter coil 103.

The controller 203 is further arranged to control the power transfer settings and to implement the required control and operational phases and functionality. In particular, the controller 203 may receive and interpret the messages from the power receiver 103, and may in response e.g. set the required power level for the power signal. Specifically, during the identification and configuration phase, the controller 203 may interpret the configuration packet or message from the power receiver 105 and may e.g. set the maximum power signal level accordingly. During the power transfer phase, the transmitter controller 203 may increase or decrease the power level in accordance with the control error messages received from the power receiver 105.

Figure 3:
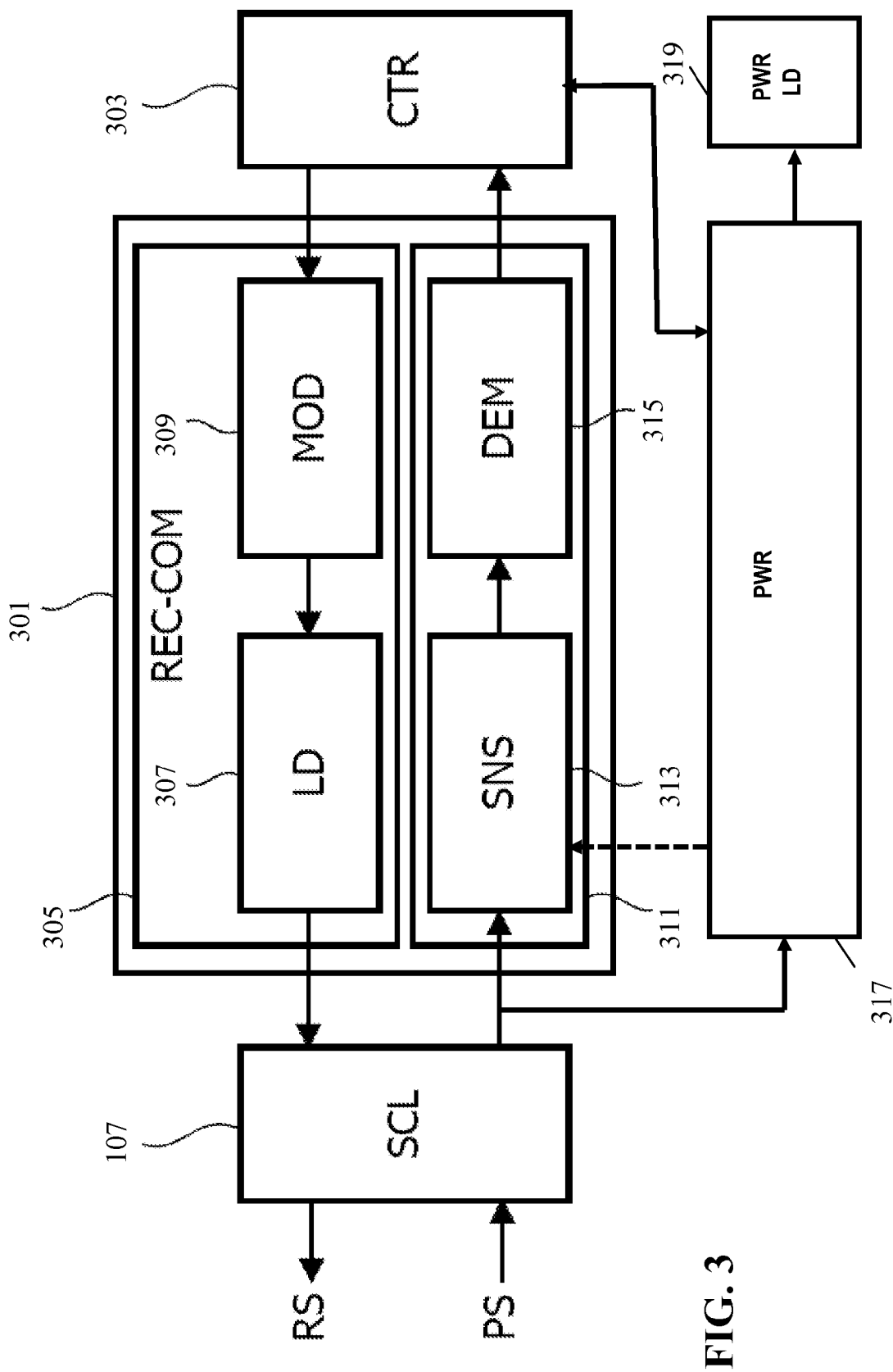
FIG. 3 illustrates an example of elements of a power receiver in accordance with some embodiments of the invention.

FIG. 3 illustrates the power receiver 105 of FIG. 1 in more detail. The receiver coil 107 (SCL) is shown connected to a power receiver communication unit 301 (REC-COM), which is coupled to a receiver controller 303 (CTR). The power receiver 105 comprises a first unit 305 for sending data to the power transmitter 101 via the receiver coil 107 to the transmitter coil 103. The first unit 305 has a changeable load (LD) 307 coupled to a modulator 309 (MOD) for modulating the load at the receiver coil 107 for generating the reflected signal (RS) for transmitting data to the power transmitter 101. It will be understood that the first unit 305 is a functional unit that comprises the modulator 309 and the changeable load 307.

The communication of data by the first unit is performed by applying the load modulation in the repeating load modulation intervals separated by intervening time intervals. In the intervening time intervals, no load modulation is applied in the example.

The power receiver 105 further comprises a second unit 311 for receiving a message from the power transmitter 101 via the receiver coil 107. For this purpose, the second unit 311 comprises a sense unit 313 (SNS) for detecting a modulated power signal (PS) received via the receiver coil 107 from the power transmitter 101, e.g. by sensing a voltage or current.

The second unit 311 further comprises a demodulator 315 (DEM), which is coupled to the sense unit 313 and the receiver controller 303. The demodulator 315 demodulates the detected signal according to the used modulation. The modulation may for example be an Amplitude Modulation (AM), Phase Modulation (PM) or Frequency Modulation (FM), and the demodulator 315 may perform the appropriate demodulation to obtain the message, e.g. by converting changes in the amplitude, frequency and/or phase of the detected signal into bits.

As an example, the receiver coil 107 may receive the power signal for inductive power transfer from the transmitter coil 103 and may send a reflected signal to the transmitter coil 103 by varying the load 307. Thus, the variations of the load 307 provide the modulation of the power signal. The modulator 309 controls the amplitude (and/or frequency and/or phase of the reflected signal), i.e. it controls the operation of the load 307, e.g. by connecting/disconnecting an impedance circuit. The current/voltage sense unit 313 senses the current/voltage on the receiver coil 107 as received from the power transmitter 101. The sense unit 313 may be part of another function of the power receiver and specifically may be part of the rectification and smoothing of the power signal used to generate a DC power. The demodulator 315 translates changes of the sensed signal into data. The receiver controller 303 (amongst other things) controls the modulator 309 to communicate data and interprets the data received by the demodulator 315.

The power receiver coil 107 is further connected to a power unit 317 which is arranged to receive the power signal and to extract the power during the power transfer phase. The power unit 317 is coupled to a power load 319 which is the load powered from the power transmitter 101 during the power transfer phase. The power load 319 may be an external power load but is typically part of the power receiver device, such as a battery, display or other functionality of the power receiver (e.g. for a smart phone the power load may correspond to the combined functionality of the smart phone).

The power receiver coil 107 may specifically include a rectifier circuit, a smoothing circuit (a capacitor) and a voltage (and/or current) regulation circuit in order to provide a stabilized DC output voltage (or current) supply.

The power unit 317 is coupled to the receiver controller 303. This allows the receiver controller 303 to determine the operational characteristics of the power circuit and e.g. may be used to provide information on the current operating point to the receiver controller 303. The receiver controller 303 may use this to generate the control error messages during the power transfer phase. The receiver controller 303 may further control the operation of the power unit 317, e.g. the receiver controller 303 may switch the load in and out. Specifically, the receiver controller 303 may control the power unit 317 to disconnect the load during the configuration phase and connect it during the power transfer phase.

In the system of FIG. 3, the sense unit 313 is shown to directly receive the power signal and the second unit 311 demodulates the data directly from the power signal. This may for example be useful for frequency modulation.

However, in many scenarios the sense unit 313 may not directly sense the power signal but rather a signal of the power unit 317.

As a specific example, the sense unit 313 may measure the rectified and smoothed voltage generated by the power unit 317. This may be particularly suitable for AM modulation of the power signal.

Figure 4:
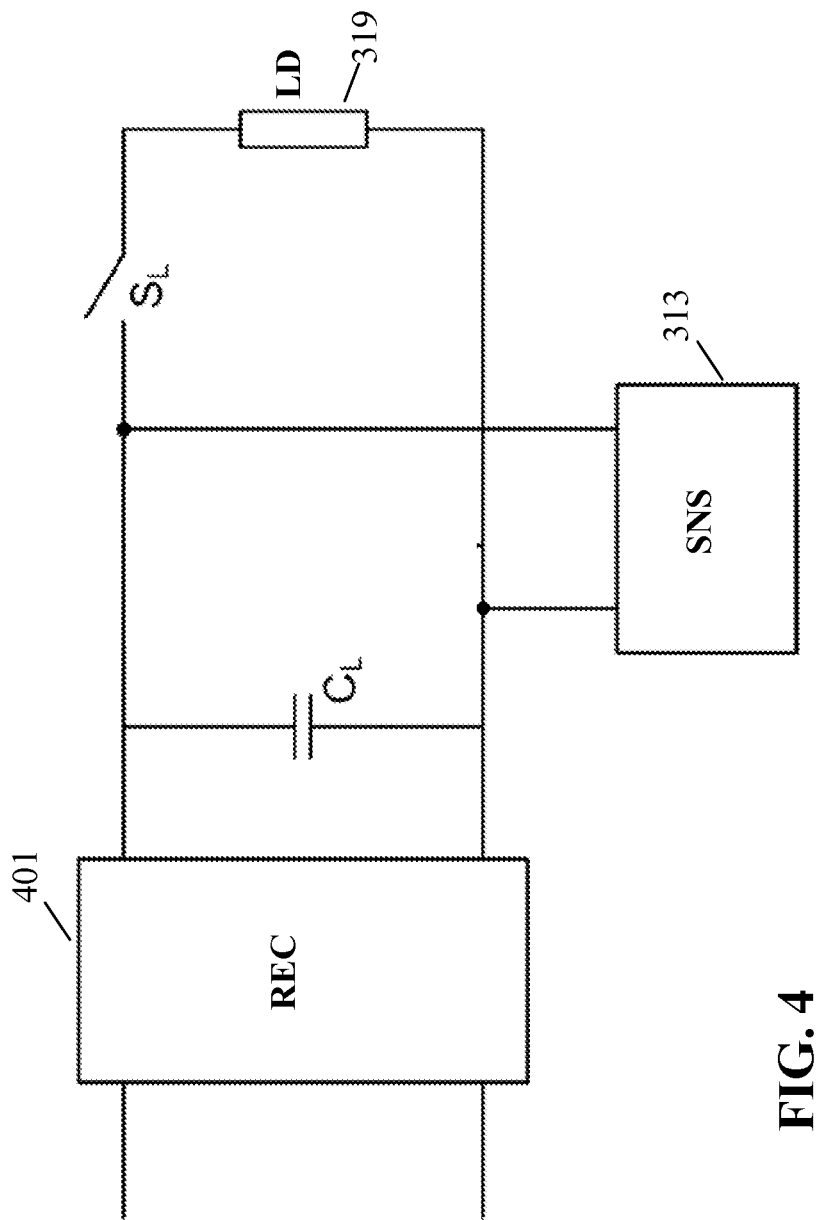
FIG. 4 illustrates an example of elements of a power receiver in accordance with some embodiments of the invention.

Specifically, FIG. 4 illustrates elements of the power unit 317 in more detail. The signal from the receiver coil 107 is rectified by a rectifier 401 (typically a bridge rectifier) and the resulting signal is smoothed by the capacitor $C_L$ resulting in a smoothed DC voltage (with a ripple depending on the power consumption and value of CL). FIG. 4 furthermore shows a switch $S_L$ for switching the power load 319 in and out. In order to ensure a sufficiently low ripple during power transfer the capacitor $C_L$ is typically selected to be relatively high thereby leading to a slow time constant for capacitor and load combination.

In the example, the power transmitter 101 may apply amplitude modulation to the power signal in order to communicate from the power transmitter 101 to the power receiver 105. This will result in amplitude changes across the capacitor $C_L$, and in the example the sense unit 313 is coupled to measure this voltage. Thus, the voltage variations across the capacitor $C_L$ may be detected and used to recover the data modulated onto the power signal.

Using such an approach may reduce cost and complexity as it allows components to be reused. However, in order to have a low ripple the capacitor $C_L$ must be relatively large which results in slow voltage variations across the capacitor $C_L$. This will be even more pronounced when the load is not connected, i.e. during the identification and configuration phase. This may restrict the data rate very substantially. Accordingly, the system of FIG. 1 applies a communication and operational protocol which is suitable for low data rate communication from the power transmitter 101 to the power receiver 105. Indeed, in many scenarios, it is advantageous if the messages from the power transmitter 101 to the power receiver 105 can be restricted to single bit messages.

The current standardization of the Qi standard is based on a unidirectional communication from power receiver to power transmitter. The operating principle is thus based on the power receiver controlling the operation as well as the adjustment and selection of operating parameters. Furthermore, the adaptation and customization of parameters is limited to a few specific operating parameters that are set during the identification and configuration phase. However, as the system is developed, this approach has been found to be very restrictive and to limit the functionality, user experience and performance that can be provided by the power transfer system. It is therefore desirable to enhance power transfer systems, such as specifically the Qi system of versions 1.0 and 1.1 of the specifications, to provide a more flexible approach for selecting and adapting operating parameters. For example, support for more power levels, including higher power levels, than supported by current standards would be desirable. As another example, the ability to select, support and optimize more complex communication protocols would be advantageous.

However, the introduction of such enhanced functionality is challenging and is subject to many difficulties and challenges. Indeed, it is required that the additional functionality allows for backwards compatibility and specifically that existing version 1.0 and 1.1 devices can be used with devices supporting the enhanced functionality. Also, the enhancements should preferably have low complexity and facilitate combination and interworking with the existing standards. Therefore, it is desirable to reduce the changes and modifications required. The further enhancements should accordingly preferably follow the design strategy and principles of the existing standard.

One preference resulting from such considerations is a preference to use modulation of the power signal as a means to communicate from power transmitter 101 to power receiver 105 rather than establishing a completely new and independent communication link with associated cost and complexity implications. However, at the same time it is desired that such a modulation does not interfere with existing functionality to such an extent that it impacts on or require modifications to other functionality.

In the system of FIG. 1, the bidirectional communication has been introduced by the power transmitter 101 being able to modulate the power signal in order to communicate messages to the power receiver 105. Thus, the power transmitter 101 introduces a deviation of the power signal relative to an unmodulated power signal where the deviation is indicative of the data being communicated. This deviation can then be detected by the power receiver 105 and used to demodulate/decode the data message.

However, in the system, the modulation of the power signal is carefully controlled to minimize the impact on the existing system. Specifically, a communication protocol is introduced which allows the power receiver to communicate by load modulation in load modulation intervals. Thus, the power receiver 105 does not continuously communicate by load modulation but only does it in certain time intervals.

This is consistent with existing Qi standards wherein a power receiver only communicates in certain load modulation intervals. For example, in the Identification and Configuration phase, a power receiver only communicates in load modulation intervals of typical durations of 20-60 ms and with intervening time intervals (the time between load modulation intervals) of around 7 msec. In the power transfer phase, a power receiver communicates in load modulation intervals of typical durations of 20 ms (although much longer packets of up to around 165 ms are possible and with intervening time intervals (the time between load modulation intervals) of typically around 250 msec.

In the system of FIG. 1, the power transmitter 101 communicates in the time intervals between the load modulation intervals, i.e. in the intervening time intervals. The power transmitter 101 accordingly communicates in these time intervals but not in the load modulation intervals. In particular, in many embodiments, and particularly when operating in the Identification and Configuration phase, the power transmitter 101 maintains a constant power signal during the load modulation intervals thereby allowing/facilitating the load modulation and detection thereof. Furthermore, the approach allows the power transmitter 101 to comply with the Qi requirement for a constant power signal for load modulation.

The approach also facilitates the communication of the data from the power transmitter 101 to the power receiver 105 as the variations to the power signal caused by the load modulation by the power receiver 105 and the modulation deviations caused by the modulation by the power transmitter 101 are separated in time. Thus, neither the first unit 213 of the power transmitter 101 nor the second unit 311 of the power receiver 105 need to consider the modulation resulting from transmissions by itself.

Furthermore, the communication of the power transmitter 101 is such that individual bits are communicated over more than one time interval. Thus, rather than transmitting one or more bits in each intervening time interval, the modulator 205 modulates a single bit across a plurality of intervening time intervals. Thus, the modulation deviation introduced to the power signal dependent on the value of a single bit affects the power signal in more than one intervening time interval.

By extending the communication of one bit over a plurality of time intervals, an increased bit/symbol energy can be achieved for a given modulation deviation/modulation depth. Thus, the use of plural intervening time intervals enable reduced error rate and/or allows the modulation deviation/modulation depth to be reduced. Thus, for a given communication reliability, the communication of the data from the power transmitter 101 may be achieved with reduced impact on the power signal. The approach thus reduces the impact of introducing bidirectional communication to a power transfer system, thereby reducing the impact on other functionality and especially existing legacy functionality. It may also provide improved power transfer with a more well defined and reliable/predictable power signal being provided to the power receiver 105.

Furthermore, the approach allows for slower variations to be introduced to the power signal which in many scenarios can facilitate practical modulation or demodulation approaches. For example, for amplitude modulation in many embodiments allow the demodulation of the power receiver 105 to be performed based on the rectified and filtered power signal using the same rectification and filtering which is used for the power transfer operation.

The approach of the system of FIG. 1 can specifically involve a modulation by the power transmitter 101 of the amplitude or frequency of the time varying magnetic field, which is used to transfer power to the power receiver device, i.e. of the power signal. The approach uses the silent time between two packets transmitted from the power receiver 105 to the power transmitter 103 as an appropriate interval for power transmitter to power receiver communications. The approach specifically uses intervening time intervals of the Identification and Configuration phase of the communications protocol defined by the Qi standard, The modulation of the power signal by the power transmitter 101 occurs only in between the end of the reception of a packet from the power receiver 105 and the pre-amble preceding the start of a succeeding packet from the power receiver 105, where the packets are communicated from power receiver 105 to the power transmitter 101 according to the existing communication protocol, i.e. using load modulation. Since the communication of these packets is based on load modulation by the power receiver 105, the power transmitter 101 advantageously does not introduce a change in the amplitude during the communication of these packets, nor does the power receiver 105 attempt to demodulate the received power signal during the load modulation intervals.

The approach may e.g. address the issue that the intervals that are available for the power transmitter to power receiver communications, in particular during the Identification and Configuration phase, are fairly short (e.g. around 7 ms). This means that it may be difficult to send multiple bits in those intervals, or even to achieve sufficient modulation to send a single bit without disturbing the communications from the power receiver to the power transmitter.

However, the system of FIG. 1 communicates a single bit from the power transmitter 101 to the power receiver 105 using multiple intervals for the transmission. This enables the use of much smaller changes to the amplitude or frequency of the time varying magnetic field than would otherwise be necessary. This is advantageous because smaller amplitude variations are much less likely to cause problems with e.g. legacy devices than are large amplitude variations.

The approach may specifically reduce the modulation depth, i.e. the level of the deviation of the power signal relative to an unmodulated power signal. Modulating the power signal may cause the received signal to exceed a required maximum or minimum value. Moreover a receiver may for example clamp the voltage at the output of the rectifier to a certain value to prevent damage to electronics; especially in case the coupling between power transmitter and power receiver is strong. Therefore, voltage variations may be suppressed/clipped thereby preventing such parameters to be used for communication. If the modulation depth is reduced in order to address such problems, it could become too small thereby increasing the error rate or even preventing the power receiver from successfully demodulating the signal. The approach of the system of FIG. 1 allows the modulation depth to be reduced while still allowing a reliable demodulation to be performed by the power receiver 105.

The modulation may specifically be performed by modulating the single bit in accordance with a predetermined modulation pattern, which is predetermined in the sense that it can be known to the power receiver 105 before this demodulates the received signal. The predetermined modulation pattern defines the modulation patterns that should be applied to the power signal to represent a given value of a single bit.

In principle, a separate and different predetermined modulation pattern could be provided for the possible values of the bits, for example one modulation pattern may be provided for a bit value of 0 and another modulation pattern may be provided for a value of 1. The power receiver 105 may then correlate the received power signal with the two potential modulation patterns to determine which bit has been transmitted by the power transmitter 101.

In some embodiments, more than one possible predetermined modulation pattern may be defined for each bit value. For example, the predetermined modulation pattern for a given bit may in some embodiments be dependent on other bits that are communicated simultaneously. Thus, in some embodiments, data symbols comprising more than one bit may be communicated simultaneously in which case the selected predetermined modulation pattern may depend on more than one bit.

As an example, if two bits are communicated as a single data symbol, four different possible predetermined modulation patterns may be used depending on the value of the data symbol, i.e. depending on the value of the two data bits. Thus, in such a case the predetermined modulation pattern for one of the bits is selected from two possible predetermined modulation patterns representing that bit but with the choice between the two being dependent on the value of the other bits.

The following will focus on an embodiment wherein only one bit value is transmitted at the time, and thus only two possible predetermined modulation patterns are used. Furthermore, in the example, the predetermined modulation patterns for the two data values are selected as being the inverse of each other, i.e. one pattern corresponds to the other pattern multiplied by −1. Accordingly, the use of two predetermined modulation patterns is in this scenario equivalent to only using a single predetermined modulation pattern which is then multiplied by the data value of the single bit (represented by the two possible data values of +1 and −1).

The following examples will focus on an example of an AM modulation. Thus, in the case the power signal is given by the equation of:

$$p(t) = A(1 + m(t) \cdot b) \cdot \sin(\omega \cdot t)$$

where A is the amplitude of the unmodulated power signal, $\omega$ is the radian frequency of the power signal, $m(t)$ is the predetermined modulation pattern, and b is the bit value (given as either +1 or −1).

However, the above continuous signal is spread over a plurality of intervening time intervals. Thus, the predetermined modulation pattern extends across multiple intervening time intervals. In other words, the modulated power signal is given by (where t=0 corresponds to the start of the first intervening time interval in which the bit is transmitted)

$$p(t) = \begin{cases} A(1 + m(t - n \cdot T' - n \cdot T) \cdot b) \cdot \sin(\omega \cdot t) & \text{for } t \in [n \cdot T' + n \cdot T; n \cdot T' + (n+1) \cdot T] \\ A \cdot \sin(\omega \cdot t) & \text{otherwise} \end{cases}$$

where T is the duration of an intervening time interval between two load modulation intervals, T' is the duration between consecutive load modulation intervals and n indicates the index for the intervening time interval and the predetermined modulation pattern extends over N time intervals, i.e. n=0 . . . N−1.

Figure 5:
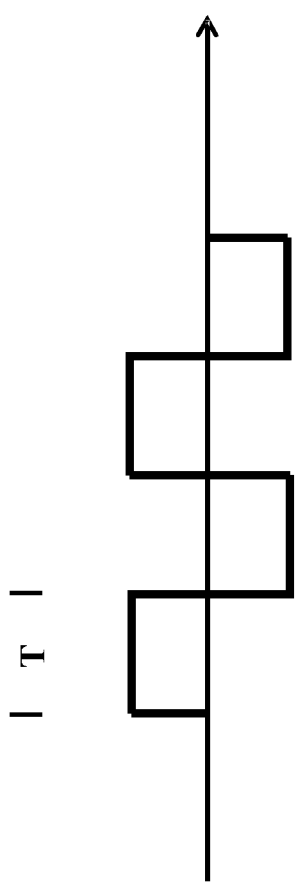
FIG. 5 illustrates an example of a predetermined modulation pattern for modulating a power signal by a power transmitter in accordance with some embodiments of the invention.

FIG. 5 illustrates an example of a predetermined modulation pattern which in this case represents an amplitude variation for an amplitude modulation. In the example, the predetermined modulation pattern consists of a series of four modulation values which each represent a single modulation amplitude offset to apply in one intervening time interval. In the example, the predetermined modulation pattern corresponds to the amplitude offsets to apply for a binary value of 1.

If the maximum amplitude variation is set to X, the predetermined modulation pattern thus indicates that for a bit of value 1, the amplitude of the power signal should be increased by X in the first intervening time interval, reduced by X in the second intervening time interval, increased by X in the third intervening time interval, and reduced by X in the fourth intervening time interval.

Figure 6:
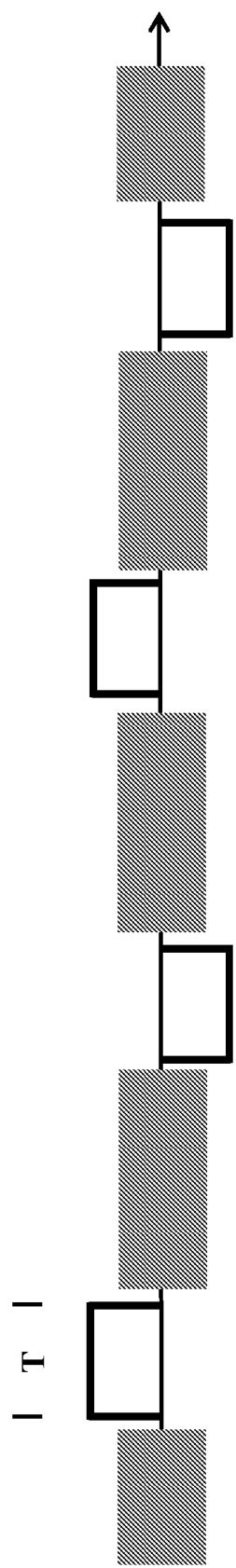
FIG. 6 illustrates an example of a modulated power signal from a power transmitter in accordance with some embodiments of the invention.

The resulting modulated power signal is illustrated in FIG. 6. In the example, the load modulation intervals are indicated by gray areas. In these time intervals, the transmitter seeks to maintain a constant power signal which the power receiver 105 then load modulates. The individual modulation offsets indicated by the predetermined modulation pattern of FIG. 5 are then applied to four consecutive intervening time intervals. It should be noted that FIG. 6 illustrate only the deviation or offset of the amplitude from the nominal, unmodulated value. This deviation may in the example be kept very small.

Figure 7:
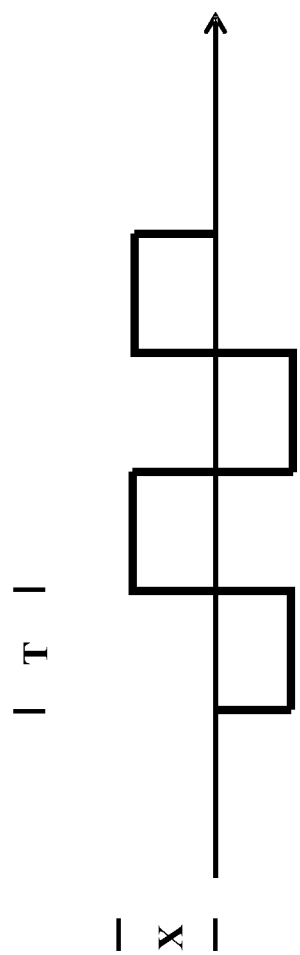
FIG. 7 illustrates an example of a predetermined modulation pattern for modulating a power signal by a power transmitter in accordance with some embodiments of the invention.

If instead the data value to communicate corresponded to −1 rather than +1 (i.e. to the binary value 0 which is mapped to the symbol −1), the power transmitter 101 may use the inverse predetermined modulation pattern, as illustrated in FIG. 7.

For this bit value, modulation pattern thus indicates that the amplitude of the power signal should be decreased by X in the first intervening time interval, increased by X in the second intervening time interval, decreased by X in the third intervening time interval, and increased by X in the fourth intervening time interval.

Figure 8:
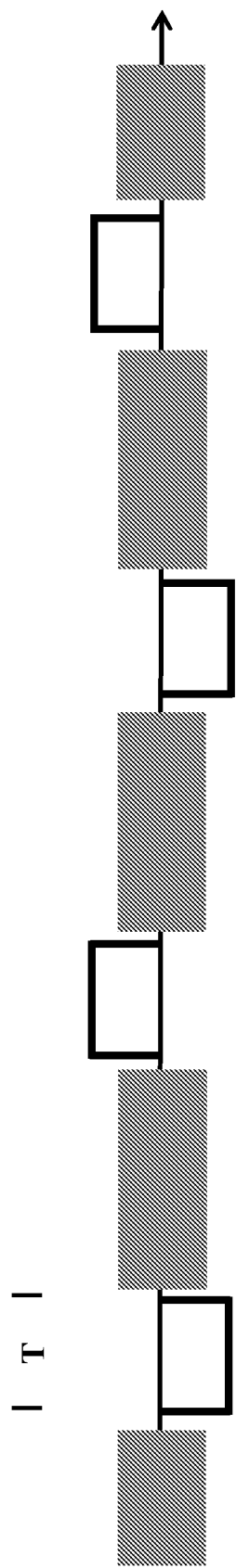
FIG. 8 illustrates an example of a modulated power signal from a power transmitter in accordance with some embodiments of the invention.

The resulting modulated power signal is illustrated in FIG. 8.

As can be seen, two different signals are generated for the two data values as defined by the two predetermined modulation patterns. The power receiver 105 can accordingly detect the transmitted data by correlating the received power signal with the two possible modulation patterns. The data value is then detected as the modulation pattern resulting in the highest correlation. The correlation is performed only for the intervening time intervals and thus the power signal is only considered during the intervening time intervals.

Furthermore, as the time used to communicate a single bit is extended over four intervening time intervals, the modulation deviation can be kept significantly lower. Indeed, in the example, the total energy per bit corresponds to 4·X·T where X is the amplitude of the modulation pattern and T is the duration of an intervening time interval (or more accurately the duration of the transmission within the intervening time interval for embodiments where the modulation extends over only part of the intervening time interval). In order to achieve the same error performance while communicating in a single time interval, the modulation offset would be required to be four times higher, thereby increasing the impact of the modulation and possibly causing this to interfere with other functionality, such as legacy functionality.

In the example of FIGS. 5-8, the predetermined modulation pattern comprises a single constant value for each intervening time interval for a given bit value. During each intervening time intervals, the modulation offset specified by the predetermined modulation pattern is accordingly applied to result in the combined modulation across the four intervening time intervals reflecting a single bit. The power receiver 105 can accordingly simply correlate the power signal of the intervening time intervals with the possible modulation pattern to determine which bit is being communicated.

In the example, the predetermined modulation pattern defines an amplitude offset pattern for the power signal, and specifically defines an amplitude offset that should be applied to the power signal in each individual intervening time interval. The amplitude offset may specifically be a voltage offset applied to the power signal, but may in other embodiments e.g. be a current offset.

Figure 9:
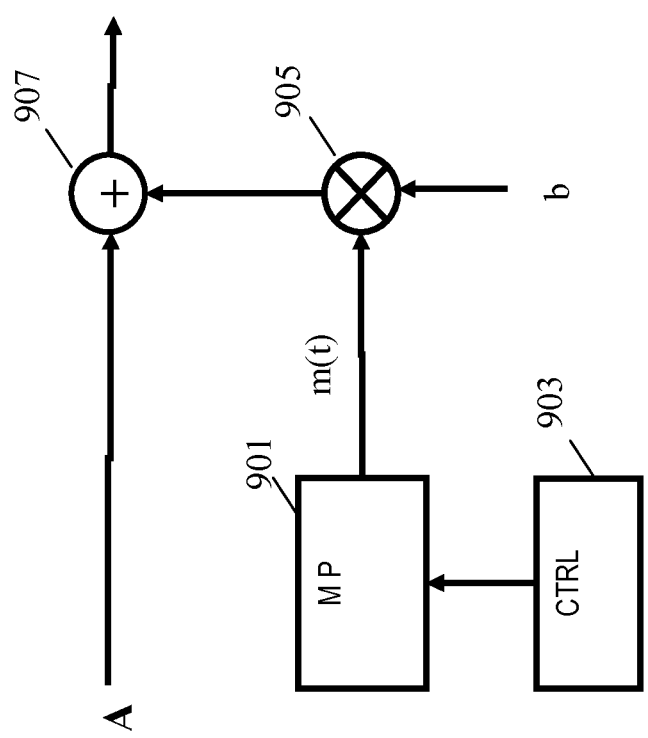
FIG. 9 illustrates an example of an approach for amplitude modulating a power signal of a power transmitter in accordance with some embodiments of the invention.

FIG. 9 illustrates an example of how the power signal may be modulated by the modulator 205 of the power transmitter 101. In the example, the power signal is amplitude modulated by a modulation offset being applied to the unmodulated power signal.

In the example, the modulator 205 comprises a memory 901 which stores a single modulation pattern, for example corresponding to the one of FIG. 5. The modulator 205 furthermore comprises a modulation controller 903 which reads out the modulation pattern in synchronization with the intervening time intervals. Thus, in the example, the modulation controller 903 controls the output of the memory 901 to provide the value of the modulation pattern for the current intervening time interval. The modulation controller 903 furthermore controls the output of the memory 901 to have a zero value outside of the intervening time intervals (i.e. during the load modulation intervals).

For the example of FIG. 5, the modulation pattern value is constant within each intervening time interval, and thus only one value needs to be stored for each intervening time interval. The memory 901 may in the example store the values of the predetermined modulation pattern at consecutive address and the modulation controller 903 may simply increment the memory address from which the output is read by one for each intervening time interval (while maintaining a zero output when not in an intervening time interval).

The resulting modulation offset is applied to a multiplicator 905 wherein the modulation offset is multiplied by the value of the bit being communicated where the bit is represented by the values −1 (corresponding to the binary value of 0) or +1 (corresponding to the binary value of 1). The resulting output of the multiplicator accordingly corresponds to FIG. 5/6 or 7/8 depending on the bit value. The resulting modulation offset is then added to the unmodulated amplitude A to provide a modulated amplitude value which is equal to A outside the intervening time intervals but is offset by a value depending on the bit value within each intervening time interval.

It will be appreciated that the size of the offset can be set at the desired level, e.g. by the predetermined modulation pattern directly reflecting the desired offset value (and thus modulation depth), or by e.g. the bit value, the memory output, or the multiplicator output being scaled appropriately.

The resulting modulated amplitude is then fed to the driver 207 which proceeds to generate a power signal with the corresponding amplitude.

In the example, two predetermined modulation patterns are generated for the bit values of 0 and 1 (represented by the values −1 and +1 respectively) by modifying a single stored predetermined modulation pattern. Specifically, the absolute value of the predetermined modulation pattern applied to the power signal is given by the stored values whereas the sign is given by the bit value. Such an approach may provide a particularly efficient implementation.

Figure 10:
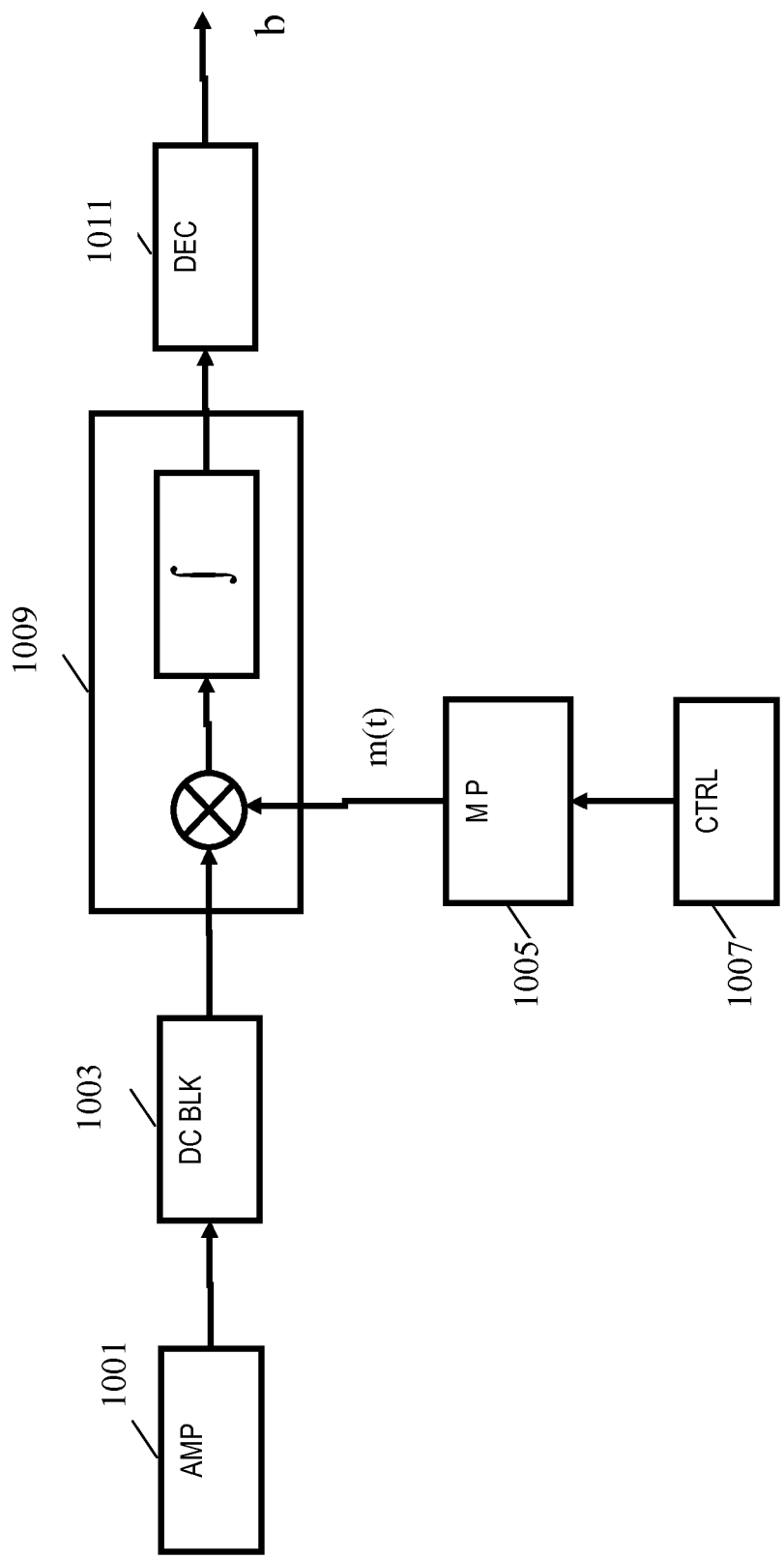
FIG. 10 illustrates an example of an approach for receiving an amplitude modulated power signal from a power transmitter in accordance with some embodiments of the invention.

FIG. 10 illustrates how the power receiver 105 may receive the signal generated by the modulator of FIG. 9.

The received power signal is first rectified and smoothed to provide an amplitude signal by an amplitude extractor 1001. The DC value is then removed from the amplitude signal by a DC extractor 1003 (e.g. simply implemented as a capacitor). The resulting signal now corresponds to that of FIG. 5 or 7 depending on the value of the data bit being communicated.

Similar to the modulator 205, the power receiver 105 comprises a memory 1005 storing the predetermined modulation pattern, such as that of FIG. 5 in the specific example. Also similarly to the modulator 205, the memory is read by a controller 1007 which synchronizes to the intervening time intervals.

The resulting local replica of the predetermined modulation pattern spread across the intervening time intervals is correlated with the amplitude signal after DC extraction in a correlator 1009. The correlation may for example be performed by multiplying the two signals and integrating over the intervening time intervals. The output of the correlator 1009 is fed to a bit decision processor 1011 which decides the received bit value. The correlation is performed only over the intervening time intervals and there is no correlation for the power signal during load modulation intervals.

Specifically, in the ideal case, the correlator 1009 will provide a (normalized) correlation of 1 if the bit value 1 was transmitted and a (normalized) correlation of −1 if the bit value −1 was transmitted. These values may of course be degraded by noise and imperfections. However, assuming symmetry of such effects, a decision criteria may be that the bit value of +1 (corresponding to the binary value 1) was transmitted if the correlation is above zero and that the bit value of −1 (corresponding to the binary value 0) was transmitted if the correlation is below zero.

In some embodiments, the amplitude modulation may be realized using existing power control mechanisms already defined for the power transmitter by changing the primary coil current. These control mechanisms include a change of the frequency, of the rail voltage, or of the duty cycle change in the (resonance) circuit driving the current into the primary coil.

In some embodiments, the amplitude demodulation may be realized with existing power measurement hardware already needed for determining the rectified power in the power receiver. The power receiver can monitor the voltage and/or the current at the output of the rectifier (see FIG. 4) to analyze if the power transmitter changes the amplitude of the power signal as expected.

It will be appreciated that the predetermined modulation pattern of FIG. 5 is merely an example of possible modulations/encodings that can be used. For example, in some embodiments, the bit may be encoded by a power signal level which is maintained across all the intervening time intervals, by a single change in the power signal level, or e.g. by multiple changes in the power signal level.

For example, starting with a default power signal level as defined in version 1.1 of the Qi specification, one of the following encodings could be applied using a constant power signal level:
a. "1"=high value (higher than default), "0"=low value (lower than default)
b. "1"=high value (higher than default), "0"=low value (equal to default)
c. Etc.

If the encoding is based on a change in the power level signal, the applied encoding may for example be one of the following:
a. "1"=change from low value to high value, or from high value to low value, "0"=no change in the value
b. "1"=change from default value other value, or from other value back to default, "0"=no change in the value
c. Etc.

If multiple changes in power levels are used, the encodings may for example be one of the following:
a. "1"=change from low to high followed by change from high to low, "0"=no change
b. "1"=change from high to low followed by change from low to high, "0"=no change In the previously described examples based on the predetermined modulation pattern of FIG. 5, four constant values corresponding to four intervening time intervals were used with a change being applied between each intervening time interval.

However, it will be appreciated that in other embodiments, the modulation offset may be non-constant within each intervening time intervals. For example, a smoother function may be used in order to reduce the frequency spread of the modulation and e.g. facilitate implementation. For example, for each intervening time interval a half sine wave change in level may be applied resulting in the power level changing gradually from the nominal power signal level and back to the nominal power signal level within each intervening time intervals. For such embodiments, the correlation may reflect the modulation variations within each intervening time intervals.

In some embodiments, the patterns may be different for different intervening time intervals. For example, in some intervening time intervals, the pattern may correspond to a half sine wave whereas in other intervening time intervals it may correspond to a full sine wave.

Figure 11:
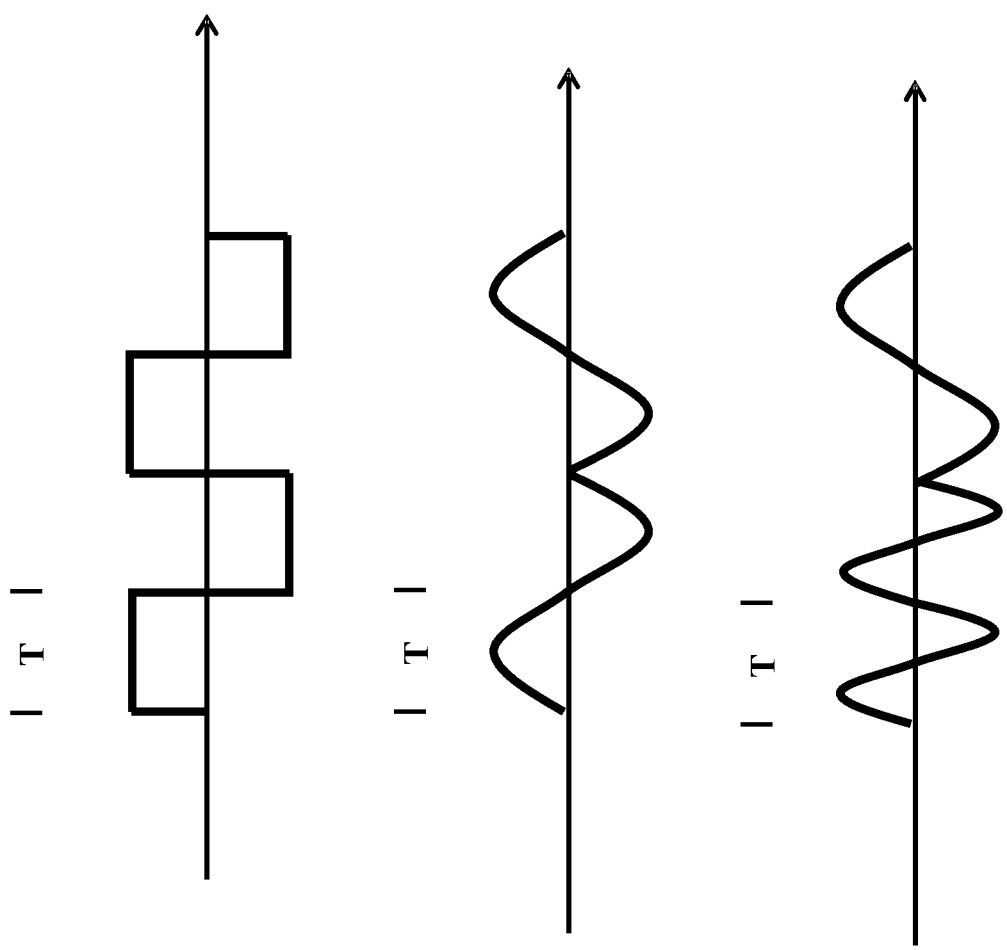
FIGS. 11 and 12 illustrate examples of predetermined modulation patterns for modulating a power signal by a power transmitter in accordance with some embodiments of the invention.

Examples of possible modulation patterns are illustrated in FIG. 11.

The use of a plurality of intervening time intervals allows the modulation deviations to be reduced. Accordingly, the predetermined modulation pattern may be designed to introduce relatively low deviations due to the modulation.

In many embodiments, the predetermined modulation pattern may correspond to an average deviation of the power signal due to the modulation which is no more than a maximum deviation between two of the plurality of intervening bits. For example, in the pattern of FIG. 5, the maximum deviation between intervening time intervals is 2·X where X is the modulation offset amplitude. However, the average deviation is much lower, and specifically is zero in the specific example.

Indeed, in many embodiments, the average modulation deviation relative to an unmodulated power signal is kept low, and indeed in many embodiments preferably less than 5% or even 2% of the nominal power signal level. In many embodiments, the predetermined modulation pattern may correspond to an average modulation offset or deviation of substantially zero.

Having a low average modulation deviation may be advantageous in many embodiments and may often reduce impact on existing functionality. Furthermore, maintaining a low average modulation deviation may also allow or assist in maintaining a low maximum deviation.

Indeed, typically in addition to maintaining a low average modulation deviation, the power transmitter 101 may maintain a low maximum modulation deviation.

Indeed, in many embodiments, the predetermined modulation pattern may be designed to result in a maximum deviation of the power signal level due to the modulation of the single bit of no more than 5%, or indeed of no more than 2% in some cases.

Such a small deviation would typically result in variations that are very difficult to detect in the power signal, e.g. due to noise. However, due to the communication of a single bit extending over multiple intervening time intervals, the small variations can be reliably detected as the correlation can be performed over much longer time intervals and thus with much greater accuracy.

Maintaining a very small maximum deviation ensures that the impact on other functionality or operations is reduced thereby reducing the risk of conflicts. Indeed, in many embodiments, the small modulation offsets may be insignificant, negligible and indeed unnoticeable by other functions, such as specifically the power transfer operation and functionality.

In some embodiments, the predetermined modulation pattern corresponds to a deviation of the power signal due to modulation of the single bit of less than a tolerance value for the power signal. For example, the power signal may be defined to have a nominal value of A within a tolerance of, say, 5%. The power transmitter 101 may in such examples be designed to be able to maintain the amplitude at the given level A within e.g. 2%. This increased accuracy may be combined with an introduction of communication based on power signal amplitude variations of 3%. This may enable bidirectional communication without affecting any other functionality. Indeed, as all equipment compliant with the standard must be designed to be capable of operating with a power signal that may deviate from the nominal value by up to 5%, it will inherently be capable of operating with the modulated power signal.

Indeed, the approach may allow for a stealth modulation wherein only equipment designed for receiving the data messages from the power transmitter 101 will be able to detect the modulation, whereas other equipment may be oblivious to the presence of any modulation. Thus, improved backwards compatibility can be achieved.

In some embodiments, the maximum modulation deviation may be increased further between the intervening time intervals, i.e. the system may not necessarily seek to minimize the modulation deviation. Rather, in some embodiments, the predetermined modulation pattern may provide a change in e.g. the amplitude level which is made up by smaller changes between a plurality of intervening time intervals.

Figure 12:
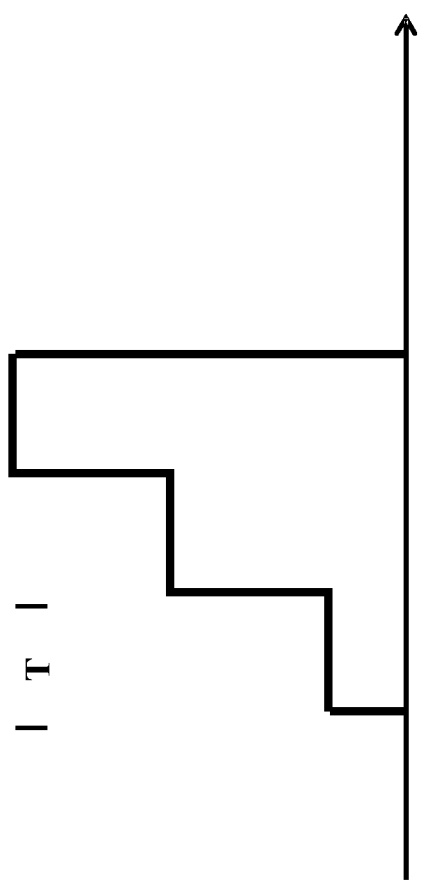

Specifically, the modulation pattern may correspond to the application of an offset to the power signal which is formed by a series of smaller changes to the power signal with each change corresponding to one intervening time interval. An example of such a predetermined modulation pattern for a modulation across three intervening time intervals is illustrated in FIG. 12.

In this example, the power transmitter 101 sends the bit during the intervening time intervals by modulating (typically) the amplitude or frequency of the power signal such that the amount of the change is accumulated from the changes during at least two of the intervening time intervals.

The approach may be illustrated by the following example.

In a wireless power transfer system, the time varying magnetic field induces an electromotive force into a receiver coil. Typically, this yields a time varying voltage across the coil, which is converted to a dc voltage using a rectifier circuit, which is attached to the receiver coil. Usually, the resulting pulsating voltage is flattened using a capacitance that is connected to the output terminals of the rectifier circuit.

As an example, the power receiver may be designed such that it can reliably detect changes of 0.5 V in the flattened output voltage (which still may be plagued by substantial ripple). In addition, it may be that it is not possible to change the time varying magnetic field in such a way that the voltage change is more than 0.2 V—e.g. because it has been experimentally determined that larger changes would be incompatible with legacy equipment. In this case, the power transmitter can change the magnetic field in three intervening time intervals (which need not necessarily be consecutive) such that the aggregate change would add up to 0.6 V. This means that after the third step, the power receiver 105 is able to reliably detect that the power transmitter 101 has sent a bit (and which value the bit has).

In the previous example, the communication from the power transmitter 101 to the power receiver 105 is based on amplitude modulation of a voltage or current of the power signal. However, in other embodiments, the predetermined modulation pattern may for example define a frequency offset pattern for the power signal. Thus, in such embodiments, the frequency of the power signal may be changed between (and/or possibly during) the intervening time intervals as defined by the predetermined modulation pattern.

The power receiver 105 may accordingly demodulate the signal to provide a signal reflecting the frequency of the power signal rather than the amplitude of the power signal and may proceed to correlate the predetermined modulation pattern with this signal. The frequency modulation may be advantageous in some embodiments. In particular, for noisy environments it may often provide a more reliable and less noisy modulation.

It will be appreciated that the described approach may be used in different phases. However, the approach may in many scenarios be particularly suitable and advantageous for a configuration phase, such as the Identification & Configuration phase of a Qi system.

In particular, the bidirectional communication is particularly advantageous during a configuration phase where the interworking between the power receiver 105 and the power transmitter 101 is established and defined. Indeed, this phase may particularly be improved by the power transmitter 101 being able to communicate with the power receiver 105. However, the time intervals between the times when the power receiver 105 communicates to the power transmitter 101 are typically very short (e.g. around 7 msec) which makes communication in the other direction very difficult. However, by using the described approach, the power transmitter 101 may be able to reliable communicate to the power receiver 105 while at the same time causing only a relatively low impact on the characteristics of the power signal caused by the modulation.

It will be appreciated that the power transmitter 101 may use the approach to communicate any suitable message. The following provides some specific examples:

Example Tx→Rx message 1

Yes/no answer to a query from the power receiver. The message can be coded with a single bit, e.g. "1" means "yes" and "0" means no.

A query can be:
  The power receiver is of version 1.1 or higher—is the version of the power transmitter also of version 1.1 or higher?
  The "workable power" of the power receiver is 5 W—does the power transmitter support that level?
  The power receiver prefers to apply another communication mode—does the power transmitter supports this mode?

Example Tx→Rx message 2

A number of bits (e.g. 4) indicating the version number of the power transmitter Example Tx→Rx message 3

A number of bits (e.g. 4) indicating the supported power level of the power transmitter Example Tx→Rx message 4

A number of bits (e.g. 4) indicating the supported communication mode of the power transmitter If a message contains multiple bits, part of the bits can be applied for error detection or error correction.

The previous description has focused on examples wherein a single binary value is communicated from the power transmitter 101 to the power receiver 105 by being modulated onto the power signal over a plurality of intervening time intervals. However, in some embodiments, the single bit being communicated over a plurality of intervening time intervals may be part of a data symbol representing more than one bit. In such an example, the data symbol may represent more than two possible values, i.e. more than the binary values represented by one bit. In such embodiments, each possible value of the data symbol may be linked to one predetermined modulation pattern, with the predetermined modulation patterns being different for the different values.

In such a case, a single bit is communicated over a plurality of intervening time intervals if the modulation (and thus the predetermined modulation pattern) differs between two possible values of the data symbol in at least two intervening time intervals. Thus, there exist two possible values of the data symbol which result in different modulations in at least two intervening time intervals. An optimal receiver must consider all time intervals in which the power signal is different in order to decide between two possible values. Therefore, an optimal receiver cannot decide between the two possible values of the data symbol without considering more than one intervening time intervals (although a suboptimal received could possibly do so at the expense of a increased error rate).

For example, as previously mentioned, the power transmitter 101 may be arranged to transmit a data symbol which represents four possible values. The data symbol thus corresponds to two bits. The four different possible values are each associated with one predetermined modulation pattern which defines the corresponding modulation for a plurality of intervening time intervals. The predetermined modulation pattern will for at least two of the values be different in at least two intervening time intervals. Thus, the modulation of (at least) two of the values (corresponding to a single bit) will be modulated over a plurality of intervening time intervals.

The approach is not limited to data symbols of an integer number of bits. However, similarly to examples wherein each data symbol corresponds to an integer number of bits, at least two possible values of the data symbol differ in the modulation of the power signal in at least two intervening time intervals. Thus, the single bit represented by these two possible values is modulated over a plurality of intervening time intervals.

As an example, a data symbol may have three possible values, corresponding to 1.58 bits. At least two of these possible data values are mapped to predetermined modulation patterns that are different in at least two intervening time intervals. Thus, the bit corresponding to these two possible data values is modulated over at least two intervening time intervals. The third data value may possibly only differ from one or both of the other data values in one intervening time interval. However, typically all possible data values will be mapped to modulations that differ in at least two intervening time intervals with respect to each of the other possible data values. Typically, the modulations differ in all intervening time intervals.

Thus, even for data symbols representing more than one bit, the power transmitter 101 modulates the power signal to represent the data symbols such that the modulation difference between at least two data values differ in a plurality of intervening time intervals. Thus, the modulation difference between pairs of data values is not limited to differences in a single intervening time intervals for all pairs.

It will be appreciated that in some embodiments, the mapping from a data value of a data symbol to the corresponding modulation may be performed via a mapping of the data values to a plurality of channel data bits/symbols which are then individually mapped to corresponding modulation formats.

For example, a binary data symbol corresponding to a single bit may be mapped into a sequence of data bits. E.g. a binary value of 0 may be mapped to a bit sequence of, say, 000 and a binary value of 1 may be mapped to a bit sequence of, say, 111. Furthermore, the channel bits may be mapped directly to a modulation deviation. For example, a channel bit value of 0 may be mapped to an amplitude offset of −X and a channel bit value of 1 may be mapped to an amplitude offset of +X. Each channel bit may be transmitted in one intervening time interval. Thus, for a binary value of 0 of the information bit, the amplitude of three (typically consecutive) intervening time intervals may be decreased by X. For a binary value of 0 of the information bit, the amplitude of three (typically consecutive) intervening time intervals may be increased by X. Thus, although the individual channel bits may be transmitted in single intervening time intervals, the information bit value being transmitted is modulated over a plurality of intervening time intervals.

As another example, the predetermined modulation pattern of FIGS. 5 and 7 may be considered to correspond to a mapping of the information bit into the bit sequences of 1010 and 0101 with each channel bit being mapped to a modulation of X and −X for respectively 1 and 0. Thus, the mapping to channel bits may be considered a representation of the predetermined modulation pattern.

As a specific example, three different bit patterns may defined for the power transmitter 101 to acknowledge a request for a specific operation received from the power receiver 105, such as e.g.:
1. 11111111 for acknowledging reception of a request and accepting the request
2. 00000000 for acknowledging the reception of a request and declining the request
3. 01010101 for acknowledging the reception of a request and indicating that the request is unknown.

The acknowledgement is thus a three value, i.e. 1.58 bit, data symbol.

In some embodiments, each channel bit can be transmitted in one intervening time interval with each channel bit being mapped e.g. to an offset of +X or −X depending on the value. Thus the acknowledgement data symbol is modulated across eight intervening time intervals.

If fewer intervening time intervals are to be used, the three values may be mapped to shorter bit sequences, such as e.g. for four time intervals:
1. 1111 for acknowledging reception of a request and accepting the request.
2. 0000 for acknowledging the reception of a request and declining the request.
3. 0101 for acknowledging the reception of a request and indicating that the request is unknown.

or for two time intervals:
1. 11 for acknowledging reception of a request and accepting the request.
2. 00 for acknowledging the reception of a request and declining the request.
3. 01 for acknowledging the reception of a request and indicating that the request is unknown.

As another example, more than one channel bit can be communicated in each time interval, e.g. for the time intervals, the eight channel bits can be communicated as two different groups:
1. A first intervening time interval in which 1111 is transmitted followed by a second intervening time interval in which 1111 is transmitted when acknowledging reception of a request and accepting the request
2. A first intervening time interval in which 0000 is transmitted followed by a second intervening time interval in which 0000 is transmitted acknowledging the reception of a request and declining the request
3. A first intervening time interval in which 0101 is transmitted followed by a second intervening time interval in which 0101 is transmitted acknowledging the reception a request and indicating that the request is unknown.

In this example, each channel bit may still be individually mapped to a modulation deviation but in this case the different modulations for four channel bits are combined within each intervening time intervals, e.g. by allowing a quarter of the intervening time interval for each channel bit. As another example, the groups of channel bits may directly be mapped to different modulations (still only three different modulations are necessary).

In order to optimize the error performance, the power receiver 105 preferably considers the entire modulation of the power signal (or at least the parts where the modulation differ between the different data values). This ensures that the signal to noise ratio is maximized and that the error rate is accordingly minimized.

However, in some scenarios the noise (including implementation noise such as quantization noise) may be sufficiently low to provide a sufficient error rate even if only part of the symbol (bit) energy is included. Therefore, in some embodiments and scenarios the power receiver 105 may determine the bit value based on only part of the transmission. For example, the decoding may be performed on a subset of the intervening time intervals over which the bit is modulated, and indeed in some scenarios based on only one intervening time interval.

For example, in the previous example wherein eight channel bits are transmitted over eight intervening time intervals, the power receiver 105 may in some scenarios where the noise is very low decode the data in only the first two intervening time intervals. If this result in values of 11 it is assumed that the total transmission is 11111111, if the values are 00 it is assumed that the total transmission is 00000000, and if the values are 01 it is assumed that the total transmission is 01010101. If the determinations are considered unreliable by the power receiver 105 (e.g. based on a signal to noise estimate), it may proceed to decode the further intervening time intervals over which the data symbol is encoded.

In some embodiments, the power transmitter 101 is arranged to not introduce any modulation of the power signal until after it has verified that the power receiver 105 is capable of receiving such communication. The power transmitter may however start at the first opportunity after it has performed such verification, such that the power receiver can quickly be informed that bidirectional communication is possible.

The detection of the compatibility of both the power transmitter 101 and the power receiver 105 being able to support the bidirectional communication may be performed in different ways.

As an example, the system may be based on the version of the equipment. For example, for a Qi system, a power receiver or power transmitter may be compatible with the bidirectional communication if it is v1.1 or higher but not if it is version 1.0.

As an example for such a Qi system, the power transmitter (of v1.1 or higher) may proceed to interpret the version field of the identification packet indicating which version of the specification the power receiver complies with. If the version is not high enough (i.e. it is below v1.1), the power transmitter will not attempt to modulate the power signal but will keep it constant (as defined the correlator 1009 before v1.1). If the version is high enough (v1.1 or higher), the power transmitter will modulate the power signal according to the new requirements to indicate it is capable of the new features of the standard (i.e. that it is of v1.1 or higher). The power receiver may detect such modulation and therewith be informed that the power transmitter will use bidirectional communication.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter for transferring power to a power receiver using a wireless inductive power signal, the power transmitter comprising:
   an inductor for providing the power signal;
   a power signal generator for driving the inductor to provide the power signal;
   a receiver for receiving data messages from the power receiver;
   a transmitter for transmitting data to the power receiver by modulating the power signal with a message;
   wherein the data messages are communicated by load of the power signal in repeating load modulation intervals, the repeating load modulation intervals being separated by intervening time intervals, and wherein the transmitter is arranged to modulate a single bit of the message across a plurality of the intervening time intervals in accordance with a predetermined modulation pattern, the modulation pattern defining modulation deviations to apply to the power signal in each of the plurality of intervening time intervals.

2. The power transmitter of claim 1, wherein the predetermined modulation pattern comprises one modulation value for each of the plurality of intervening time intervals, each modulation value defining a modulation offset for the power signal for a value of the single bit.

3. The power transmitter of claim 2, wherein each modulation offset is a constant offset for the corresponding intervening time interval.

4. The power transmitter of claim 2, wherein each modulation offset is a non-constant predetermined pattern for the corresponding intervening time interval.

5. The power transmitter of claim 1, wherein the predetermined modulation pattern corresponds to an average deviation of the power signal due to modulation of the single bit of no more than a maximum deviation between two of the plurality of intervening time intervals.

6. The power transmitter of claim 1, the predetermined modulation pattern corresponds to a maximum deviation of the power signal due to the modulation of the single bit of no more than 5%.

7. The power transmitter of claim 1, wherein the predetermined modulation pattern corresponds to a series of step changes between constant deviations in each intervening time interval, the predetermined pattern comprising step changes of opposite signs.

8. The power transmitter of claim 1, the predetermined modulation pattern corresponds to a deviation of the power signal due to modulation of the single bit of less than a tolerance value for the power signal.

9. The power transmitter of claim 1, wherein the modulation pattern corresponds to applying an offset to the power signal formed by a series of smaller changes to the power signal, each change corresponding to one intervening time interval.

10. The power transmitter of claim 1, wherein the transmitter is arranged to generate a modulation offset for a first intervening time interval by determining a sign value of the modulation offset in response to the single bit and an amplitude of the modulation offset in response to the predetermined modulation pattern corresponding to the first intervening time interval, and to apply the modulation offset to the power signal in the first intervening time interval.

11. The power transmitter of claim 1, wherein the predetermined modulation pattern represents an amplitude offset pattern for the power signal.

12. The power transmitter of claim 1, wherein the predetermined modulation pattern represents voltage variations applied to the power signal.

13. The power transmitter of claim 1, wherein the predetermined modulation pattern represents a frequency offset pattern for the power signal.

14. The power transmitter of claim 1 wherein the transmitter is arranged to transmit the message during a configuration phase performed by the power transmitter and the power receiver.

15. A power receiver for receiving power from a power transmitter using a wireless inductive power signal, the power receiver comprising:
an inductor for receiving the power signal;
a transmitter for transmitting data messages to the power transmitter;
a receiver for receiving a message from the power transmitter;
wherein the data messages being communicated by load modulation of the power signal in repeating load modulation intervals, the repeating load modulation intervals being separated by intervening time intervals, and
wherein the receiver is arranged to demodulate a single bit of the message across a plurality of the intervening time intervals in accordance with a predetermined modulation pattern, the modulation pattern defining modulation deviations to match to the power signal in each of the plurality of intervening time interval.

16. A power transfer system, comprising:
a power transmitter for transferring power to a power receiver using a wireless inductive power signal, the power transmitter comprising:
an inductor for providing the power signal;
a power signal generator for driving the inductor to provide the power signal;
a receiver for receiving data messages from the power receiver;
a transmitter for transmitting data to the power receiver by modulating the power signal with a message, wherein the data messages are communicated by load modulation of the power signal in repeating load modulation intervals, the repeating load modulation intervals being separated by intervening time intervals, and wherein the transmitter is arranged to modulate a single bit of the message across a plurality of the intervening time intervals in accordance with a predetermined modulation pattern, the modulation pattern defining modulation deviations to apply to the power signal in each of the plurality of intervening time intervals; and
the power receive for receiving power from the power transmitter using a wireless inductive power signal, the power receiver comprising:
an inductor for receiving the power signal;
a transmitter for transmitting data messages to the power transmitter;
a receiver for receiving a message from the power transmitter; wherein the data messages being communicated by load modulation of the power signal in repeating load modulation intervals, the repeating load modulation intervals being separated by intervening time intervals, and wherein the receiver is arranged to demodulate a single bit of the message across a plurality of the intervening time intervals in accordance with a predetermined modulation pattern, the modulation pattern defining modulation deviations to match to the power signal in each of the plurality of intervening time interval.

17. A method of operation for a power transmitter arranged to transfer power to a power receiver using a wireless inductive power signal, the power transmitter comprising an inductor for providing the power signal, and a power signal generator for driving the inductor to provide the power signal, the method comprising:
receiving data messages from the power receiver;
transmitting data to the power receiver by modulating the power signal with a message;
wherein the data messages are communicated by load modulation of the power signal in repeating load modulation intervals, the repeating load modulation intervals being separated by intervening time intervals, wherein the transmitting data comprises modulating a single bit of the message across a plurality of the intervening time intervals, and wherein transmitting comprises modulating the single bit in accordance with a predetermined modulation pattern, the modulation pattern defining modulation deviations to apply to the power signal in each of the plurality of intervening time intervals.

18. A method of operation for a power receiver arranged to receive power from a power transmitter using a wireless inductive power signal, the power receiver comprising an inductor for receiving the power signal, and the method comprising:

transmitting data messages to the power transmitter; and receiving a message from the power transmitter by demodulating the power signal;

wherein the data messages are communicated by load modulation of the power signal in repeating load modulation intervals, the repeating load modulation intervals being separated by intervening time intervals, and wherein receiving comprises demodulating a single bit of the message across a plurality of the intervening time intervals and comprises demodulating the single bit in accordance with a predetermined modulation pattern, the modulation pattern defining modulation deviations to match to the power signal in each of the plurality of intervening time interval.

* * * * *